(12) United States Patent
Denchev et al.

(10) Patent No.: US 12,159,206 B1
(45) Date of Patent: *Dec. 3, 2024

(54) TOTALLY CORRECTIVE BOOSTING WITH CARDINALITY PENALIZATION

(71) Applicant: Google LLC, Mountain View, CA (US)

(72) Inventors: Vasil S. Denchev, West Lafayette, IN (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,331

(22) Filed: Apr. 3, 2023

Related U.S. Application Data (63) Continuation of application No. 16/555,943, filed on Aug. 29, 2019, now Pat. No. 11,620,573, which is a continuation of application No. 14/291,988, filed on May 30, 2014, now abandoned.

(60) Provisional application No. 61/830,033, filed on May 31, 2013.

(51) Int. Cl.
  *G06N 20/00* (2019.01)
  *G06N 10/00* (2022.01)
(52) U.S. Cl.
  CPC ............. *G06N 20/00* (2019.01); *G06N 10/00* (2019.01)
(58) Field of Classification Search
  CPC ................................. G06N 20/00; G06N 10/00
  USPC .......................................................... 706/12
  See application file for complete search history.

(56) References Cited

U.S. PATENT DOCUMENTS

| 7,668,346 | B2 | 2/2010 | Xiao et al. | |
| 9,207,760 | B1 | 12/2015 | Wu et al. | |
| 10,817,796 | B2 * | 10/2020 | Macready | G06N 20/00 |
| 10,990,677 | B2 * | 4/2021 | Wiebe | G06N 20/00 |
| 11,620,573 | B1 * | 4/2023 | Denchev | G06N 10/00 |
| | | | | 708/200 |
| 2008/0219565 | A1 | 9/2008 | Hattori | |
| 2009/0316983 | A1 | 12/2009 | Han et al. | |

(Continued)

OTHER PUBLICATIONS

Ferreira et al., "Boosting algorithms: A review of methods, theory, and applications." Ensemble machine learning: Methods and applications, 2012, 35-85.

(Continued)

*Primary Examiner* — James C Kerveros
(74) *Attorney, Agent, or Firm* — Fish & Richardson P.C.

(57) ABSTRACT

Methods, systems, and apparatus, for totally corrective boosting with cardinality penalization are described. One of the methods includes obtaining initialization data identifying training examples, a dictionary of weak classifiers, and an active weak classifier matrix. Iterations of a totally corrective boosting with cardinality penalization process are performed, wherein each iteration performs operations comprising selecting a weak classifier from the dictionary of weak classifiers that most violates a constraint of a dual of the primal problem. The selected weak classifier is included in the active weak classifier matrix. The primal problem is optimized, and a discrete weight vector is determined. Weak classifiers are identified from the active weak classifier matrix with respective discrete weights greater than a threshold. The regularized risk is optimized, and a continuous weight vector is determined. The classifier is determined as an ensemble identified by the weak classifiers and the continuous weight vector.

12 Claims, 5 Drawing Sheets

(56) References Cited

U.S. PATENT DOCUMENTS

| | | |
|---|---|---|
| 2012/0185415 A1 | 7/2012 | Chenthamarakshan et al. |
| 2012/0237116 A1 | 9/2012 | Xiao |
| 2013/0013539 A1 | 1/2013 | Chenthamarakshan et al. |
| 2014/0187427 A1* | 7/2014 | Macready ................ G06N 7/01 706/46 |
| 2021/0081779 A1* | 3/2021 | Kanazawa ............. G06N 3/044 |
| 2024/0071217 A1* | 2/2024 | Mattelaer ......... G08G 1/096725 |

OTHER PUBLICATIONS

Warmuth et al. "Boosting algorithms for maximizing the soft margin", In Advances in Neural Information Processing Systems NIPS, MIT Press, 2007, 8 pages.

* cited by examiner

TOTALLY CORRECTIVE BOOSTING WITH CARDINALITY PENALIZATION

CROSS-REFERENCE TO RELATED APPLICATIONS

This application is a continuation of U.S. patent application Ser. No. 16/555,943, filed on Aug. 29, 2019, which is a continuation of U.S. patent application Ser. No. 14/291,988, filed on May 30, 2014, which claims the benefit of U.S. Provisional Application Ser. No. 61/830,033, filed on May 31, 2013. The disclosures of the prior applications are incorporated by reference in the disclosure of this application.

BACKGROUND

This specification relates to data processing techniques that use boosting to generate a strong classifier, e.g., a linear combination of weak classifiers, from multiple weak classifiers.

SUMMARY

This specification describes a totally corrective boosting with cardinality penalization process with explicit cardinality regularization for training a classifier. The process with explicit cardinality regularization includes solving a combinatorial optimization problem which is not known to be efficiently solvable with existing classical methods. For small cases, the optimization can be performed to yield exact solution. In general the optimization can be performed using conventional hardware and techniques to yield useful, approximate solutions. Additionally, commercial quantum optimization technology performing adiabatic annealing can be used to generate good solutions more quickly.

The totally corrective boosting with cardinality penalization process determines a solution to an optimization problem using column generation as the optimization framework. The system ensures sparsity of the solution, e.g., sparsity of a weight vector that identifies a combination of weak classifiers determined as the solution to the optimization problem, using cardinality penalization. The totally corrective boosting with cardinality penalization process solves the full optimization problem over a dictionary of classifiers $\mathcal{H}$ in incremental steps by considering only a small subset of active classifiers, i.e., active columns in a matrix of active classifiers H, H $\subset \mathcal{H}$ and augmenting H one classifier at a time. Each active classifier in H is associated with a respective weight that identifies the linear combination of active classifiers. Only classifiers with associated nonzero weights in the optimal solution need to be explicitly considered as part of H. Therefore most classifiers in the dictionary of weak classifiers $\mathcal{H}$ can be ignored throughout the totally corrective boosting with cardinality penalization process.

Hence, in an iteration of the totally corrective boosting with cardinality penalization process t, a t-dimensional problem, known as restricted master problem (RMP), is optimized. After solving an RMP, the process generates the next RMP by finding a classifier from $\mathcal{H}$ that violates an optimality condition. Because of convex duality, for all classifiers that are already in H, solving the current RMP also satisfies the corresponding dual constraints. Termination occurs when no such violation can be found anymore. From this perspective, solving primal RMPs in successive iterations corresponds to solving increasingly tightened relaxations of the full dual problem over $\mathcal{H}$: violated dual constraints for classifiers in $\{\mathcal{H} - H\}$ are brought into consideration and satisfied one at a time. Upon termination, the totally corrective boosting with cardinality penalization process assigns zero weights for classifiers still in $\mathcal{H}$ -H because their dual constraints are not violated. Optimality is achieved by having primal and dual feasibility with equal objective values on the full problem over $\mathcal{H}$.

The subject matter described in this specification can be implemented in particular embodiments so as to realize one or more of the following advantages. Ensemble classifiers can be compact and sparse. Sparsity can be ensured using cardinality penalization in a totally corrective boosting process, e.g., a boosting process that updates all active coordinates, i.e., all classifiers in the boosting process, in each iteration of the process. The ensemble classifiers can be generated quickly using quantum data processing hardware. The totally corrective boosting with cardinality penalization process can provide highly-accurate classifiers for use in resource-constrained environments ranging from mobile/wearable devices to micro drones, deep-space probes, and other hardware.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

The system of this specification receives a dictionary of weak classifiers, and determines a subset of weak classifiers from the dictionary of weak classifiers to classify training data, i.e., assign a label to the data. The determined subset of weak classifiers can then be used on other data to predict classifications, e.g., determine whether email is 'spam' or 'not spam'. Each weak classifier is correlated to a true classification of the training data at more than a threshold level, e.g., greater than at random. For instance, a weak classifier can be that if an email includes the word 'pills', the email is to be labeled as 'spam' instead of 'not spam'. Since emails can include 'pills' and not be spam, the system can assign a weight to the weak classifier, along with other weak classifiers, and generate a linear combination of weak classifiers that properly classifies data.

The totally corrective boosting with cardinality penalization process enforces a sparsity-inducing cardinality penalization, i.e., the $l_0$ pseudo-norm, on the linear combination of weak classifiers in order to produce a combination with as few active weak classifiers as possible.

The system computes a solution to a cardinality-penalized primal problem:

$$\min_w \sum_{i=1}^{m} l(y_i \mathcal{H}_{i:} w) + \nu 1^\top w + \lambda \operatorname{card}(w) \geq 0,$$

where card(w)={i: $w_i \neq 0$}|, $\mathcal{H}$ is a matrix of columns, each column representing the responses of one weak classifier to training examples, w is a set of classifier weights that each correspond to a weight of a weak classifier, l denotes a loss function, $y_i \mathcal{H}_{i:} w$ is the margin of example i with label $y_i$, the $l_1$ term includes a negligible but non-zero $\nu$ to avoid ill-posed optimization problems, $\lambda$ is a regularization parameter that determines the impact of cardinality penalization, and card(w) is the cardinality penalization term and counts the number of nonzero elements in w.

Generally $\mathcal{H}$ is finite but very large, and thus, it may be impractical to directly solve regularized risk minimization over $\mathcal{H}$. In computing the solution to the primal problem, the system can take incremental steps and solve the primal problem in iterations. For example, instead of solving the full minimization problem associated with the entire matrix $\mathcal{H}$, the system selects a particular weak classifier column or a subset of the columns, of $\mathcal{H}$ and augments one column at a time.

In some implementations computing a solution to the primal problem is performed in part using quantum hardware, e.g., adiabatic quantum computers that implement quantum annealing, described below with reference to FIG. 2. In the implementations where quantum hardware is utilized, the system performs convex optimization on the result of the output of the quantum hardware to refine the solution.

Figure 1:
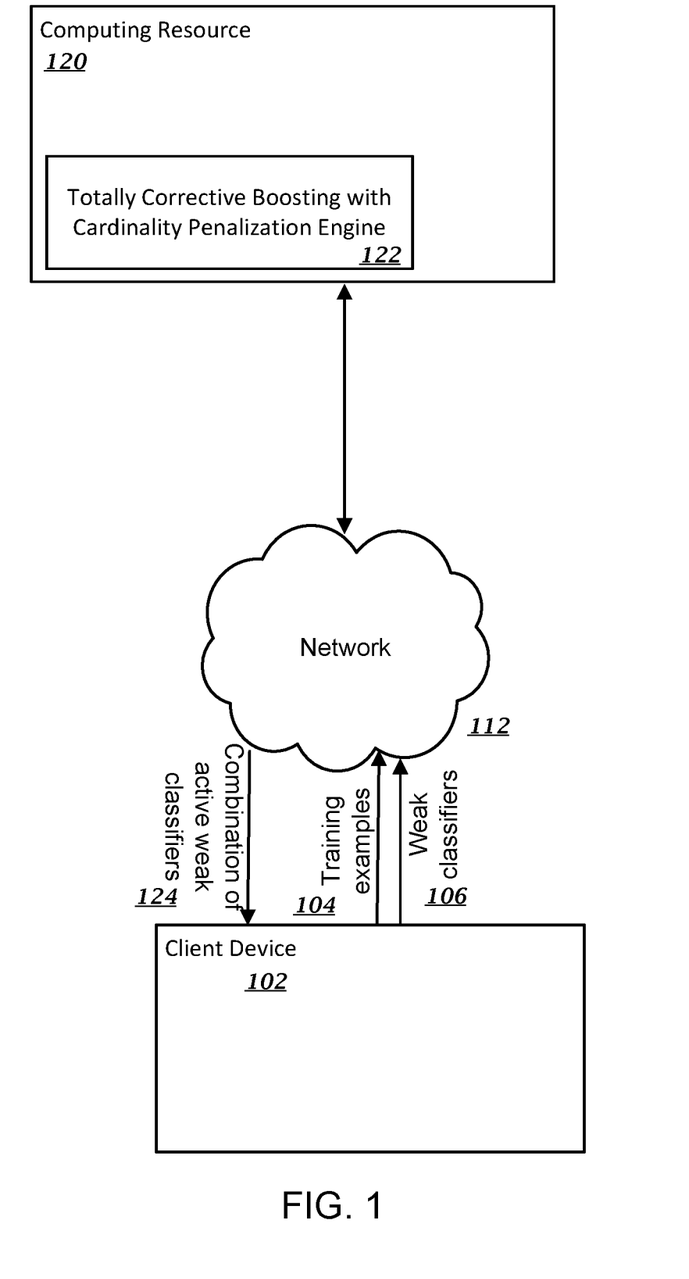
FIG. 1 is an illustration of an example system for totally corrective boosting with cardinality penalization.

FIG. 1 is an illustration of an example system for determining a linear combination of active weak classifiers. The system includes a computing resource 120 that can include one or more classical computers, one or more software computing units executing in virtual machines on one or more computers, and is configured to execute a totally corrective boosting with cardinality penalization process. In some implementations the computing resource can include quantum optimization hardware, e.g., adiabatic quantum hardware that can implement quantum annealing. In some implementations the quantum hardware can perform quantum annealing on an Ising model or restricted Ising model. The quantum hardware can receive data and instructions from the classical computing resource, and output data to the classical computing resource.

The computing resource 120 includes a totally corrective boosting with cardinality penalization engine 122 to receive data, e.g. training examples 104, and determine a linear combination of active weak classifiers 124, obtained from a dictionary of weak classifiers, that are strongly correlated with a true classification of the training examples. Each active weak classifier can be a feature of an overall set of features associated with a classification of data, e.g., a classification can be whether an email is spam or not, and a feature can identify that if the word 'pills' is in an email then the email is spam. The dictionary of weak classifiers can be constructed as a collection of decision stumps, each active weak classifier taking one of the original features. Additionally, the system determines a set of classifier weights w that identify a classifier weight for each determined active weak classifier in the linear combination of active weak classifiers 124. The set of classifier weights w can be stored by the system as a 32 or 64 bit floating point value. The computing resource 120 can then provide the client device 102 with the linear combination of active weak classifiers 124.

In this specification the term "engine" will be used broadly to refer to a software based system or subsystem that can perform one or more specific functions. Generally, an engine will be implemented as one or more software modules or components, installed on one or more computers, e.g., classical or quantum computers, in one or more locations. In some cases, one or more computers will be dedicated to a particular engine; in other cases, multiple engines can be installed and running on the same computer or computers.

In some implementations, one or more clients can access the computing resource 120 of the system using client devices, e.g., a client device 102, and through a network 112, e.g., the Internet, a local area network, wide area network, or a virtual network, to use the totally corrective boosting with cardinality penalization engine 122 to train classifiers. An example of a client device 102 is a computer. Using the client device 102, a client can provide the computing resource 120 with data for training a classifier. Such data can include training examples 104 used in machine learning, e.g., data identifying spam emails from a set of emails, data defining an eye gesture detector, and data identifying a dictionary of weak classifiers 106, e.g., classifiers to detect contrast changes in a face to identify facial features.

Figure 2:
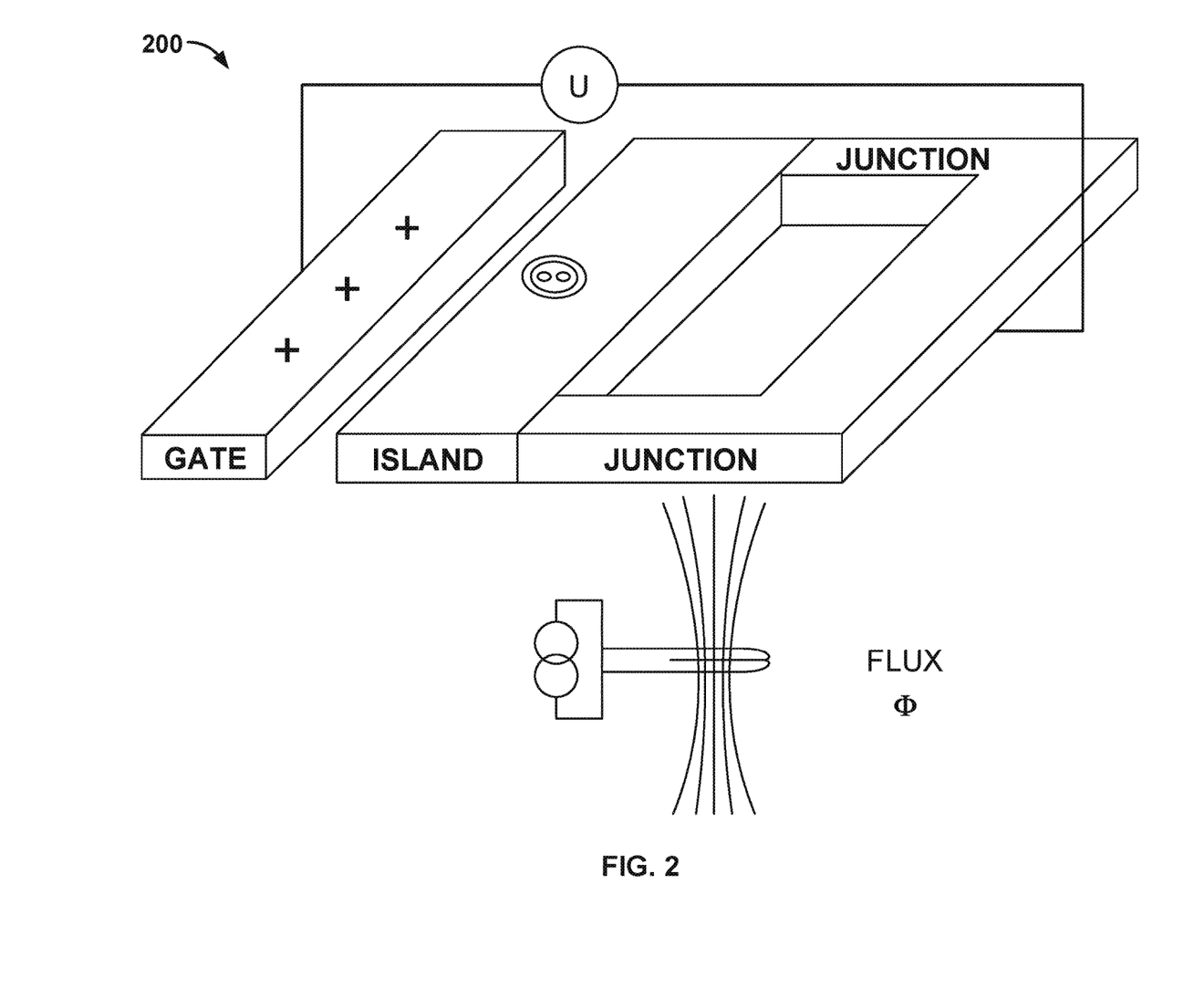
FIG. 2 illustrates an example of quantum optimization hardware.
Figure 3:
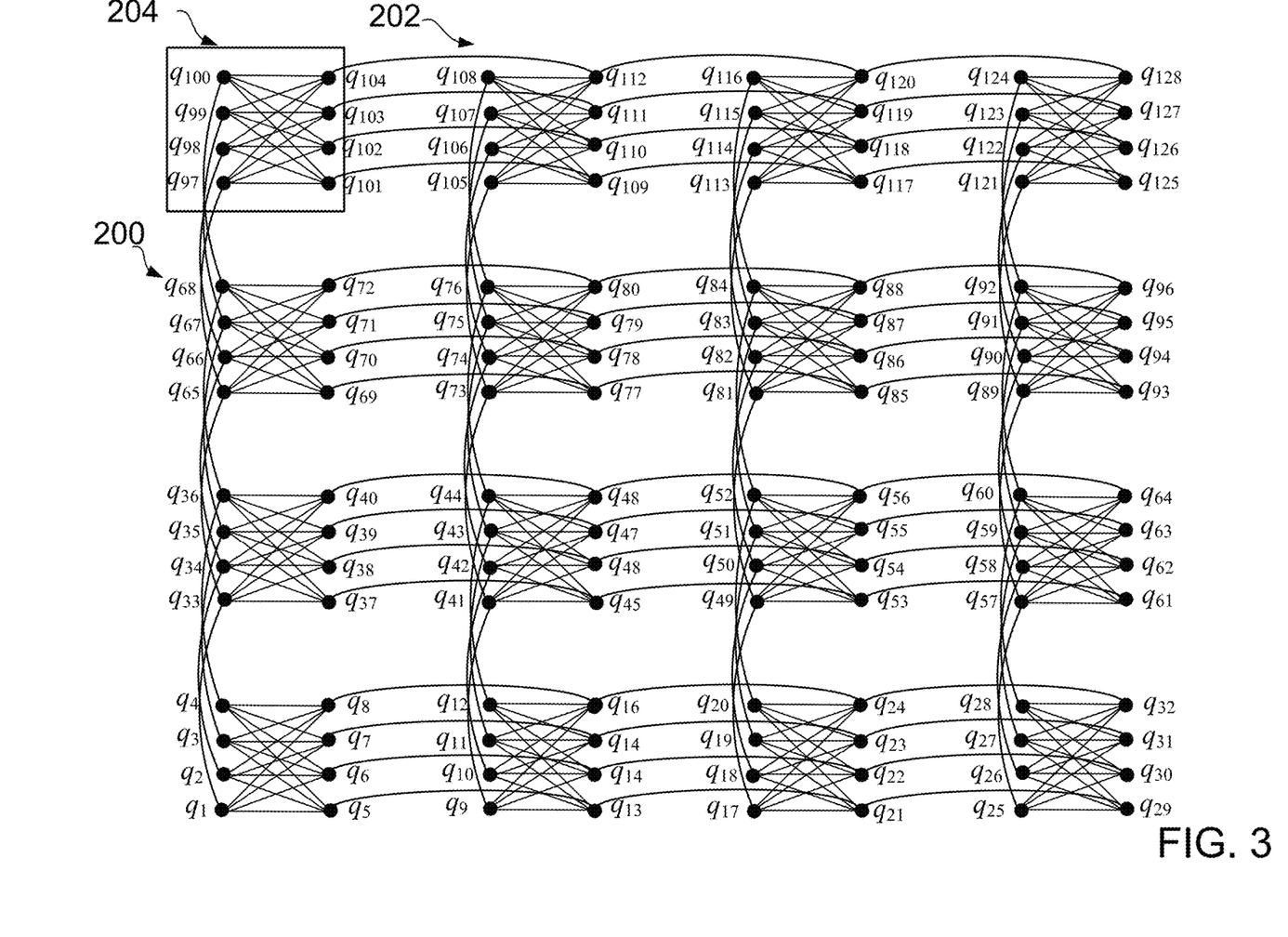
FIG. 3 is a Chimera graph showing interacting qubits on an example chip of quantum optimization hardware.

FIG. 2 illustrates an example of quantum optimization hardware that include qubits 200 formed with, e.g., superconducting Niobium loops. As shown in FIG. 3, the quantum optimization hardware contains a chip 202 that can include, for example, 8 by 8 unit cells 204 of eight qubits 200, connected by programmable inductive couplers as shown by lines connecting different qubits 200. Generally, a chip of qubits 200 will be made with a number of qubits 200 that is a power of 2, e.g., 128 or 512 or more qubits 200. The qubits 200 and couplers between different qubits 200 can be viewed as the vertices and edges, respectively, of a Chimera graph with a bipartite structure, as illustrated in FIG. 3.

The chip 202 is a programmable quantum annealing chip. The global energy of the chip can be written as:

$$E(s_1, \ldots, s_N) = \sum_{i=1}^{N} h_i s_i + \sum_{i<j=1}^{N} J_{ij} s_i s_j$$

Where $s_i$ represents the ith qubit and is binary:
$s_i \in \{-1, +1\}$;
N is the total number of qubits 200 in use, and
$h_i, J_{ij} \in \mathbb{R}$ Different problems to be solved can be defined by the different input, real parameters $h_i$ and $J_{ij}$, which can be derived from training data. The sparsity of the parameter $J_{ij}$ is constrained by the hardware connectivity (i.e., the connectivity of the qubits 200 shown in FIG. 3). For disconnected qubits 200, the corresponding $J_{ij}$ is 0.

In searching for a ground state for the global energy defined by a particular problem, adiabatic quantum annealing is applied. By defining a Hamiltonian for a problem to be solved and inputting the parameters of the Hamiltonian, a machine learning training system can use the chip to perform quantum annealing to reach a global ground state, at which point the chip outputs the state of each qubit 200, e.g., in the form of a bit string:

$$s^* = \underset{s}{\operatorname{argmin}}\ E_{Ising}(s) = \underset{s}{\operatorname{argmax}}\left\{\sum_{i,j} s_i J_{ij} s_j + \sum_i h_i s_i\right\}$$

Figure 4A:
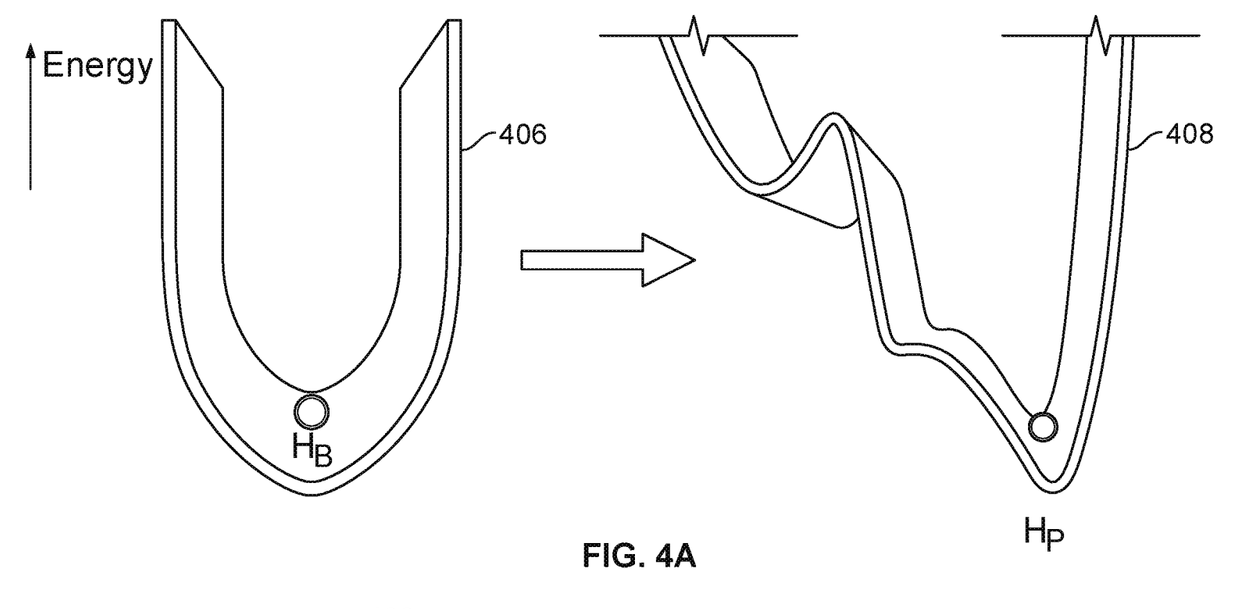
FIG. 4A is a schematic plot of two example Hamiltonians used in quantum optimization hardware.
Figure 4B:
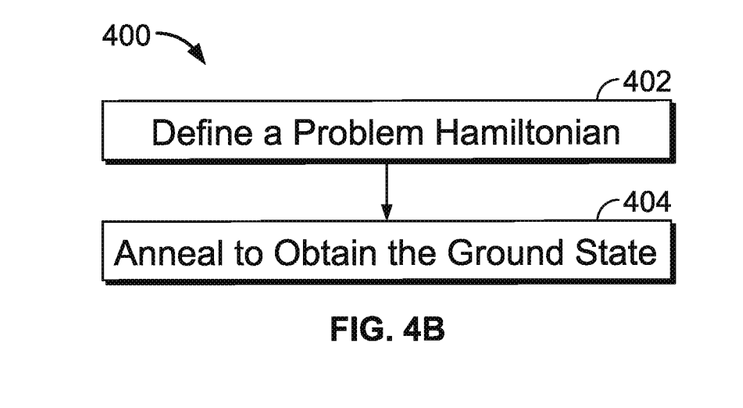
FIG. 4B is a flow diagram showing an example process of defining and annealing a Hamiltonian.

An example conventional process 400 using quantum annealing is shown in FIGS. 4A and 4B. First, a problem Hamiltonian Hp is defined (402), e.g., as H(t)=(1−t/T) HB−t/T HP, where HB is an initial Hamiltonian with a known and easily preparable ground state, and HP is the problem Hamiltonian whose ground state encodes the solution to a given instance of an optimization problem, e.g., mapped from the model to be developed. Then, the problem Hamiltonian is annealed (404) to reach a ground state that provides the solution to the optimization problem. During the annealing process, quantum dynamical evolution adds alternative physical paths to escape local minima of the global energy due to quantum tunneling. A quantum oracle can perform based on the possibility of multi-particle correlated quantum tunneling through local energy barriers, even when the system does not have enough thermal energy to jump over the energy barriers in a classical process employed in alternative algorithms, such as simulated annealing.

Figure 5:
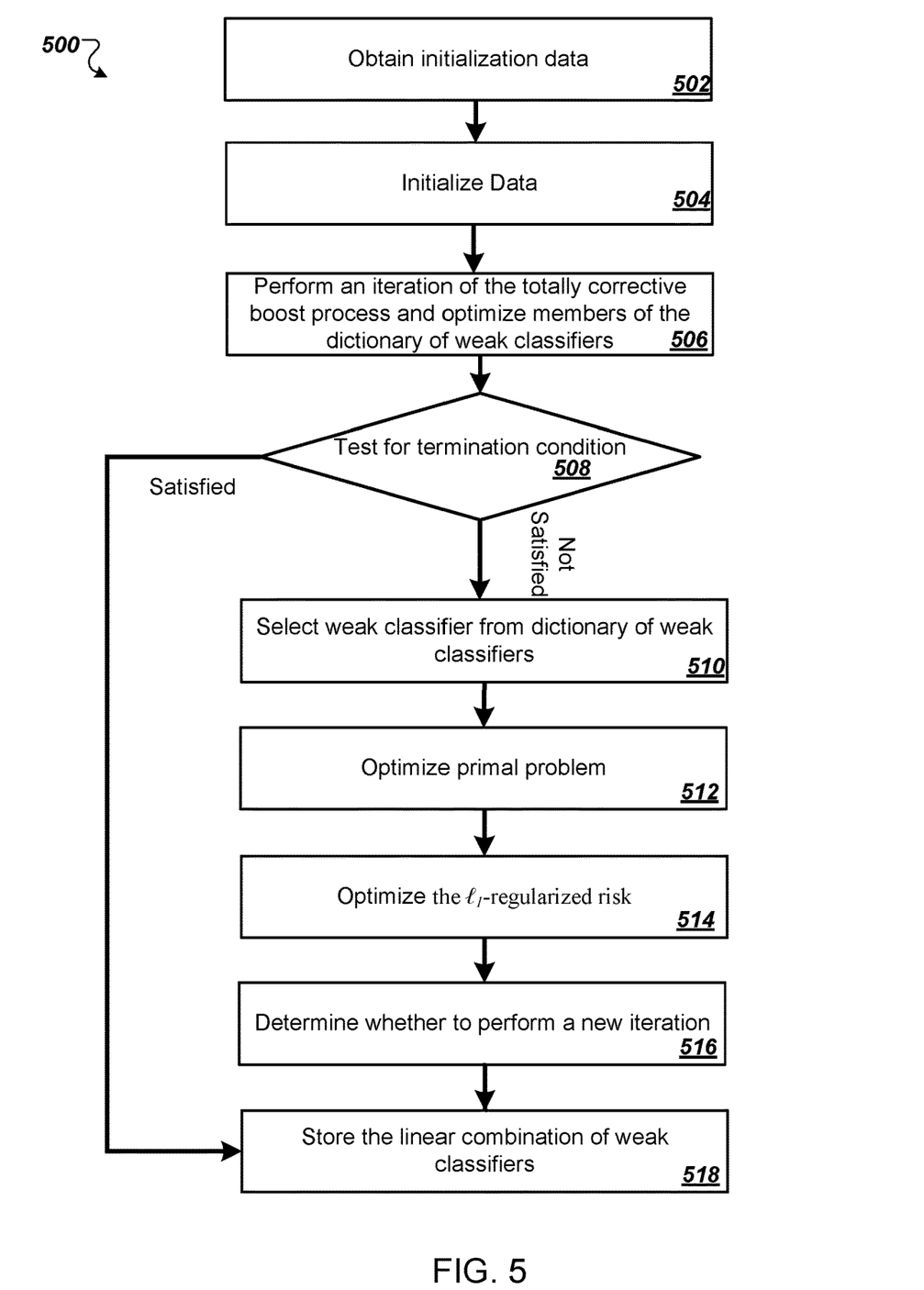
FIG. 5 is a flow diagram of an example process for totally corrective boosting with cardinality penalization.

FIG. 5 is a flow diagram of an example process 500 for determining a linear combination of active weak classifiers. The process 500 can be performed by a system of one or more appropriately programmed computers, e.g., the computing resource 120 of FIG. 1.

As described above, the system computes a solution to a primal problem to determine a linear combination of weak classifiers used to classify data:

$$\min_w \sum_{i=1}^m l(y_i h(x)_{k:} w) + v\mathbf{1}^\top w + \lambda\ \text{card}(w) \ge 0,$$

$$\text{where card}(w) = |\{i : w_i \ne 0\}|$$

The linear combination of weak classifiers is equal to: $\Sigma\ w_k h_{:k}(x)$ such that $w_k>0$. That is, the linear combination of weak classifiers is the sum of all weak classifiers $h_{:k}(x)$ in a dictionary of weak classifiers h(x) with respective non-zero classifier weights $w_k$, determined by the system in computing the solution. A matrix of active weak classifiers H stores the weak classifiers from the dictionary of weak classifiers with non-zero classifier weights. The matrix of active weak classifiers gets modified to include a new weak classifier when the system computes an iteration of a totally corrective boosting with cardinality penalization process, described below with reference to step 506.

The system receives, e.g., from a client device, initialization data identifying m training examples, and a dictionary of weak classifiers (step 502). The m training examples can have the form: (x, y), i.e., $(x_1, y_1 \ldots x_m, y_m)$ where each x is a training example and each respective y is a label identifying a true classification of the training example. The dictionary of weak classifiers is a matrix of weak classifiers h(x). Each column of the dictionary of weak classifiers represents a particular weak classifier, e.g., a particular feature of a set of features associated with classifying training examples. Each column $h(x)_{:k}$ can store the responses of a weak classifier to the training examples x, e.g., each response in a column $h(x)_{:k}$ can be either the value +1, or the value −1. Each row of the matrix of weak classifiers $h(x)_{k:}$ can store the responses of each weak classifier to a particular training example, e.g., the first row of the matrix of weak classifiers stores the responses of each weak classifier to the first training example.

The initialization data further identifies a loss function $l(\gamma_i)$, e.g., an exponential loss function, a hinge loss function, a logistic loss function, or a square loss function. The loss function $l(\gamma_i)$ identifies the loss at margin $\gamma_i=y_i h(x)_{:i:} w$, i.e., the margin of training example i with associated label $y_i$ with respect to a particular linear combination of weak classifiers identified by a set of classifier weights w, e.g., each weight in the set of classifier weights defines the weight of a weak classifier in the linear combination of weak classifiers.

The initialization data further identifies regularization parameters ν and λ, optimization tolerance ϵ, e.g., 5*10$^{-4}$, or 10$^{-5}$, and a maximum number of iterations T, e.g., 100, 1,000, or 10,000.

The system initializes data used in totally corrective boosting with cardinality penalization (step 504). The system defines a set of non-negative example weights u, where each example weight $u_i$ is the weight the system gives to the $i_{th}$ training example $(x_i, y_i)$. In some implementations the sum of each example weight can equal to one, e.g., u can be defined by:

$$u_i = \frac{1}{m}, \forall\ i = 1,$$

..., m where m is the number of training examples. Each iteration of a totally corrective boosting with cardinality penalization process, described below in step 506, can modify the set of example weights u.

Furthermore, the system initializes an ensemble (H, w) to be an empty set, where H is a matrix that stores active weak classifiers being used by the system. The matrix of active weak classifiers H includes weak classifiers obtained from the dictionary of weak classifiers h(x). The set of classifier weights w includes a classifier weight for each weak classifier in the matrix of active weak classifiers H.

The system performs an iteration of a totally corrective boosting with cardinality penalization process and optimizes members of the dictionary of weak classifiers h(x) with the current example weights u (step 506). That is, the system uses the current example weights u to optimize each $h_k(x)$ in h(x).

The system tests to see if a termination condition is satisfied (step 508). In some implementations the system determines whether the matrix of active weak classifiers H includes every weak classifier in the dictionary of weak classifiers h(x). Upon a positive determination, the termination condition is satisfied and the system determines the linear combination of weak classifiers, described below in step 518.

In some implementations, the system determines whether there are any columns in the dictionary of weak classifiers h(x) that violate an optimality condition. The system determines a weak classifier that violates constraints of the dual of the primal problem. That is the system determines a weak classifier that violates:

$$\min_u \sum_{i=1}^m l^*(-u_i) \text{s.t.}\ u^\top \text{diag}\,(y) h(x) \le v\mathbf{1}^\top,$$

$l^*(-u_i)$ is the Fenchel conjugate of $l(\gamma_i)$, y is the set of labels in the training examples.

If the system cannot determine a weak classifier that violates constraints of the dual, then the termination condition is satisfied. The system then determines the linear combination of weak classifiers, described below with reference to step 518.

Upon termination, the set of classifier weights w implicitly gives zero weight to weak classifiers remaining in the dictionary of weak classifiers h(x) because, for those weak classifiers, their dual constraints are not violated.

If the termination condition is not satisfied, the system selections a weak classifier that introduces the most violated constraint of the dual of the primal problem (step 510). The system selects a weak classifier to include in the matrix of active weak classifiers H. That is, the system determines weak classifiers that violate:

$$\min_u \sum_{i=1}^m l^*(-u_i) \text{ s.t. } u^\top \text{diag}(y)h(x) \le v1^\top$$

In particular, the system selects a weak classifier that satisfies:

$$\hat{h}(x) = \text{argmax}_{h(x)} \sum_{i=1}^m u_i y_i h(x_i)$$

In selecting a weak classifier, the system selects from the weak classifiers that have not been previously selected for inclusion in the matrix of active weak classifiers H.

The system adds the selected weak classifier as a column in the matrix of active weak classifiers H.

The system optimizes the primal problem (step 512). The system optimizes the primal problem for cardinality-penalized and $\ell_1$-regularized risk minimization over loss l:

$$\min_w \sum_{i=1}^m l(y_i \mathcal{H}_i; w) + v1^\top w + \lambda \, \text{card}(w) \ge 0, \text{ where } \text{card}(w) = |\{i : w_i \ne 0\}|$$

with the training data, the matrix of active weak classifiers H, regularization parameters, and optimization tolerance ϵ over discrete classifier weight variables ẇ.

The set of classifier weights w is converted into discrete classifier weights ẇ that each have a specific bit depth, e.g., 1 bit, . . . , 8 bits, . . . , 12 bits, and so on. In some implementations the system can include quantum hardware, and optimizing the primal problem can be performed on the quantum hardware, discussed above with reference to FIG. 2. In these implementations the quantum hardware can have a specific amount of qubits available for use. The classifier weights, converted into discrete classifier weights, can then be mapped to the quantum hardware with a fixed amount of qubits. The system can receive the bit depth from a client, or in some implementations the system can determine a bit-depth, described below in step 514. In implementations where the system does not include quantum hardware, the system can implement a classical heuristic process to optimize the primal problem, e.g., a multi-start tabu search process.

The system updates the matrix of active weak classifiers H by including all weak classifiers $h_k(x)$ that have respective discrete weight variables greater than a threshold, e.g., $\dot{w}_k > 0$, $10^{-5}$, $10^{-3}$, and so on.

The system optimizes the $\ell_1$-regularized risk (step 514). That is, the system performs convex optimization on the matrix of active weak classifiers H. Since the matrix of active weak classifiers H includes only weak classifiers that have discrete classifier weights greater than a threshold, e.g., $\dot{w}_k > 0$, the system performs a convex optimization process to refine the determined discrete classifier weights. The optimization step 512 selects the active weak classifiers to include in the matrix of active weak classifiers, and the optimization step 514 determines a set of continuous classifier weights w for the selected active weak classifiers. The system uses the training examples, the matrix of active weak classifiers H, regularization parameters, and optimization tolerance ϵ in the convex optimization process. In some implementations the system performs a limited memory Broyden-Fletcher-Goldfarb-Shanno process, e.g., L-BFGS-B.

In implementations with quantum hardware, the system can determine an optimal bit-depth. The system can increase the bit-depth and adjust the range of ẇ in each iteration until the best non-cardinality penalization empirical risk over a set of continuous classifier weights w can be reached to within a threshold tolerance. The system can then run the cardinality-penalized discrete optimization using the discrete variables ẇ, described above in step 512. That is, the system can adjust the range of the bit-depth in successive iterations based on optimal values of the continuous weight variables w. If the continuous weight variables need a higher bit depth, e.g., the continuous weight variables need a large range of values, the system can adjust the bit depth to be higher.

The system determines whether to perform another iteration of the totally corrective boosting with cardinality penalization process (step 516). The system determines the number of iterations is greater than the maximum number of iterations T. Upon a positive determination the system stores the matrix of active weak classifiers H and the set of classifier weights w, described below in step 518. Upon a negative determination the system updates the example weights u:

$u_i = -l'(y_i H_i; w)$, where each example weight $u_i$ is equal to the derivative of the loss function at the margin of training example i.

The system then performs a new iteration, described above with reference to step 506.

The system stores the matrix of active weak classifiers H and the set of classifier weights w (step 518). The system stores:

(H, w)=({$h_k(x)$}, {$w_k$}) for k such that $w_k$>threshold.

The threshold can be, e.g., 0, $10^{-5}$, $10^{-3}$, and so on.

The matrix of active weak classifiers and the set of classifier weights identify the linear combination of weak classifiers that can classify the training examples. His therefore a boosted ensemble of classifiers, and a proper subset of the dictionary of classifiers h(x).

In some implementations the system can perform totally corrective boosting with cardinality penalization, i.e., step 506, after the system performs early-stopping unregularized column generation. That is, the system can first perform an ordinary $l_1$-regularized column generation with a negligibly small but nonzero regularization coefficient v. Nonzero v is needed for avoiding ill-posed optimization problems in the case of separable data. Early stopping, i.e., determining whether the number of iterations has exceeded a maximum threshold, is applied when too many columns are generated before reaching the termination criterion defined by v and the tolerance ϵ. Even without an explicit cardinality penalization term in the primal, early stopping puts the final solution in a local minimum of the cardinality-penalized primal. This is so because early stopping ensures that all columns that could yet be generated are left with zero classifier weights in the final ensemble, and any point in the primal space with at least one zero-weighted classifier is a local minimum for card(w).

Once the system has performed early-stopping unregularized column generation for T iterations, the system obtains T classifiers and performs a totally corrective boosting with cardinality penalization process starting from those T classifiers. The system repeats the totally corrective boosting with cardinality penalization process for a variety of λ values and stores the performance after the termination of each process.

In some other implementations, the system first performs early-stopping unregularized column generation, and then solves the primal, described above with reference to FIG. 5, once for different λ values. The system then stores the performance after the termination of each process.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a programmable quantum annealing chip and one or more computers, the programmable quantum annealing chip comprising a plurality of qubits, wherein the plurality of qubits are connected by programmable couplers, and one or more storage devices storing instructions that are operable, when executed by the programmable quantum annealing chip and the one or more computers, to cause the programmable quantum annealing chip and the one or more computers to perform operations comprising:
obtaining initialization data identifying a plurality of training examples and an active weak classifier matrix; and
performing one or more iterations of a totally corrective boosting with cardinality penalization process until a termination condition is satisfied, wherein performing the one or more iterations comprises:
selecting a weak classifier from a dictionary of weak classifiers,
including the selected weak classifier in the active weak classifier matrix,
performing quantum annealing with the quantum annealing chip to optimize a primal problem based, in part, on the training examples, the active weak classifier matrix, and a plurality of classifier weights, to select one or more weak classifiers with respective discrete weights greater than a threshold, wherein the classifier weights are mapped to the qubits of the quantum annealing chip, and
optimizing $\ell$ 1-regularized risk using the identified one or more weak classifiers and the training to provide a set of continuous classifier weights for the selected active weak classifiers, and
determining whether the termination condition is satisfied, wherein determining whether the termination condition is satisfied comprises determining whether a maximum number of iterations has been performed, wherein when the maximum number of iterations has been performed, the process comprises storing in memory the active weak classifier matrix and the set of continuous classifier weights, and wherein when the maximum number of iterations has not been performed, performing another iteration of the totally corrective boosting with cardinality penalization process.

2. The system of claim 1, wherein quantum annealing is performed on an Ising model or a restricted Ising model.

3. The system of claim 1, wherein the plurality of qubits comprise superconducting loops.

4. The system of claim 1, wherein each unit cell comprises 8 qubits.

5. The system of claim 1, wherein the programmable couplers comprise inductive couplers.

6. The system of claim 1, wherein optimizing the primal problem includes using, wherein each of the discrete weights is a non negative fixed point n-bit value, and each bit of each of the n-bit values is mapped to a corresponding quantum bit of the programmable quantum annealing chip.

7. A quantum-computer implemented method comprising:
obtaining, by a programmable quantum annealing chip, initialization data identifying a plurality of training examples and an active weak classifier matrix, wherein the programmable quantum annealing chip comprises a plurality of qubits connected by programmable couplers;
performing one or more iterations of a totally corrective boosting with cardinality penalization process until a termination condition is satisfied, wherein performing the one or more iterations comprises:
selecting a weak classifier from a dictionary of weak classifiers,
including the selected weak classifier in the active weak classifier matrix,
performing quantum annealing with the quantum annealing chip to optimize a primal problem based, in part, on the training examples, the active weak classifier matrix, and a plurality of classifier weights, to select one or more weak classifiers with respective discrete weights greater than a threshold, wherein the classifier weights are mapped to the qubits of the quantum annealing chip, and
optimizing $\ell$ 1-regularized risk using the identified one or more weak classifiers and the training to provide a set of continuous classifier weights for the selected active weak classifiers, and
determining whether the termination condition is satisfied, wherein determining whether the termination condition is satisfied comprises determining whether a maximum number of iterations has been performed, wherein when the maximum number of iterations has been performed, the process comprises storing in memory the active weak classifier matrix and the set of continuous classifier weights, and wherein when the maximum number of iterations has not been performed, performing another iteration of the totally corrective boosting with cardinality penalization process.

8. The quantum-computer implemented method of claim 7, wherein quantum annealing is performed on an Ising model or a restricted Ising model.

9. The quantum-computer implemented method of claim 7, wherein the plurality of qubits comprise superconducting loops.

10. The quantum-computer implemented method of claim 7, wherein each unit cell comprises 8 qubits.

11. The quantum-computer implemented method of claim 7, wherein the programmable couplers comprise inductive couplers.

12. The quantum-computer implemented method of claim 7, wherein optimizing the primal problem includes using, wherein each of the discrete weights is a non negative fixed point n-bit value, and each bit of each of the n-bit values is mapped to a corresponding quantum bit of the programmable quantum annealing chip.

* * * * *